(12) United States Patent
Zoratti et al.

(10) Patent No.: US 6,929,282 B1
(45) Date of Patent: Aug. 16, 2005

(54) VEHICLE IMPACT SENSING SYSTEM

(75) Inventors: Paul K. Zoratti, South Lyon, MI (US);
Jeffery A. Bochenek, Milford, MI (US); David Ming Chi, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/070,884

(22) PCT Filed: Sep. 27, 2000

(86) PCT No.: PCT/US00/26522

§ 371 (c)(1),
(2), (4) Date: Nov. 12, 2002

(87) PCT Pub. No.: WO01/23224

PCT Pub. Date: Apr. 5, 2001

Related U.S. Application Data

(60) Provisional application No. 60/156,165, filed on Sep. 27, 1999.

(51) Int. Cl.[7] ............................................. B60R 21/32
(52) U.S. Cl. ....................... 280/735; 180/274; 340/436
(58) Field of Search ........................ 280/735; 180/274; 340/436; 701/45

(56) References Cited

U.S. PATENT DOCUMENTS

| | | | | |
|---|---|---|---|---|
| 5,419,407 A | * | 5/1995 | Meyer et al. | 280/735 |
| 5,428,534 A | * | 6/1995 | Wetzel et al. | 280/735 |
| 5,445,412 A | * | 8/1995 | Gillis et al. | 280/735 |
| 5,583,476 A | * | 12/1996 | Langford | 338/211 |
| 5,797,623 A | * | 8/1998 | Hubbard | 280/735 |
| 6,169,479 B1 | * | 1/2001 | Boran et al. | 340/436 |

* cited by examiner

*Primary Examiner*—Peter C. English
(74) *Attorney, Agent, or Firm*—Sally J. Brown

(57) ABSTRACT

A vehicle impact sensing system for detecting impact events to a vehicle, and allowing deployment decisions of passive restraint devices based on information gathered and relayed regarding such impact events. The sensing system includes one or more sensor elements capable of directly detecting vehicle deformation occurring as a consequence of the impact event. The sensor elements generate an output that varies upon deformation of the element. The sensor elements are in communication with a restraints control module. Upon deformation of the sensor element, the control module receives impact signals from the sensor elements based upon the altered output, and discriminates between impact events that warrant deployment of a passive restraint, such as a side air bag, and those that do not. The control module utilizes information gathered from the sensor elements to make deployment decisions, such as which restraint to deploy and the appropriate degree of deployment.

15 Claims, 3 Drawing Sheets

VEHICLE IMPACT SENSING SYSTEM

CROSS REFERENCE TO RELATED APPLICATION

This application claims the benefit of U.S. Provisional Application No. 60/156,165, filed Sep. 27, 1999.

FIELD OF THE INVENTION

The present invention relates to a sensing system employed to detect vehicular impact events; and more particularly to a vehicular impact sensing system that utilizes sensors to directly detect vehicle deformation by impact events and actuate restraints, such as inflatable restraints, in the motor vehicle.

BACKGROUND OF THE INVENTION

Almost all passenger motor vehicles presently produced include some type of impact deployed restraint system to protect vehicle occupants, or others, during a vehicle impact event. Such restraint systems may include, for example, front and side airbags within the passenger compartment, side curtains, inflatable seat belts, and seat belt pretensioners. A restraint system may also include deployable restraints for the protection of pedestrians involved in impacts with the vehicle, such as pedestrian airbags and hood release mechanisms. Sensing systems typically control the deployment of such restraints by detecting the occurrence of a vehicle impact event.

During most impact events, the opportunity to provide occupant restraint exists only for a very brief period of time. Furthermore, inadvertent deployment of a restraint, such as an airbag, is undesirable. Therefore, to be most effective, impact deployed restraints must deploy quickly when needed, and only when actually needed. To this end, impact sensors must be able to discriminate between severe and relatively harmless impact events and also be insensitive to mechanical inputs which are not associated with crash events. Most importantly, however, the design of the sensor must allow for rapid detection of the impact event and transmission of relevant information to allow for effective deployment decisions. The need for a sensor which allows for rapid deployment decisions is particularly great with side airbags, where the crush zone is much smaller than that associated with front airbags, and the time available for a deployment decision is likewise shorter.

Several types of sensors have been used for detection of impact events in vehicles. For example, sensors comprised of piezoelectric cables, accelerometers, pressure sensors and crush-zone switches, have been utilized. While these sensors can operate adequately, it is desirable to improve the ability of vehicle impact sensing systems to discriminate between impact events, such as vehicle crashes, that warrant deployment of a passive restraint, and those that do not, such as a minor impact with a shopping cart. Furthermore, it is desirable to improve the ability of the sensor to provide information regarding the impact, such as its location and relative size, thereby increasing the effectiveness of subsequent deployment decisions.

Consequently, there is a need for an impact sensing system that utilizes sensors capable of relaying information about an impact and making deployment decisions based on such information.

SUMMARY OF THE INVENTION

In its embodiments, the present invention comprises a vehicle sensing system that utilizes sensor elements to directly detect deformation of the vehicle and provide information regarding the impact. Direct detection of vehicle deformation, as opposed to indirect detection, allows the sensor to relay more accurate and detailed information regarding the impact event. As a consequence, the sensing system according to the present invention has an ability to discriminate among impact events, and allows for effective deployment decisions.

The sensing system of the present invention includes a sensor element for such direct detection of vehicle deformation. The sensor is mounted in a manner that allows the sensor to directly detect an impact event. That is, the sensor operates as a consequence of its direct physical involvement in the impact. The sensor is in electronic communication with a controller, which receives and interprets electronic signals from the sensor.

The sensing system of the present invention can be utilized to directly obtain information about impact events in a variety of vehicle locations. For example, sensors can be located in the vehicle door to gather information concerning side impacts. Likewise, a sensor can be embedded directly into a vehicle bumper to obtain information regarding frontal impacts. Wherever located, the sensor elements provide information regarding an impact, allowing for more effective deployment decisions. The sensor element preferably constitutes a bend sensitive resistance element having conductive layers such as an ink which has been printed onto a substrate and treated to produce cracks in its structure. When the bend sensitive resistance element is bent, such as occurs in a vehicle crash, the cracks open and increase the resistance of the element. The bend sensitive resistance element may be a single unitary element, or a plurality of independent elongate elements horizontally situated so as to be capable of providing azimuthal resolution of the impact event. The bend sensitive resistance element may either be disposed on a structural element of the vehicle, such as within a vehicle door, or contained within a sealed housing. Use of a sealed housing protects it from environmental contamination while also imparting a modular design that facilitates installation. Furthermore, the housing may define functional elements that increase the capabilities of the sensing system. For example, the housing may define crush actuators that facilitate the transmission of the impact to the resistance element. Means are adapted for mounting the housing adjacent a structural member of the vehicle, and extending generally along the member.

The controller subsequently makes deployment decisions based on the signals received from the sensor element. The present invention further contemplates a method of discriminating among impact events, the method comprising the steps of: directly sensing vehicle deformation via the sensor; producing a corresponding electronic deformation signal; determining the severity of the impact as compared to a threshold value; and actuating at least one deployable restraint if the threshold is exceeded by the severity of the impact.

Accordingly, an object of the present invention is to provide a sensing system that employs a sensor element to directly detect vehicle deformation and subsequently to provide an electronic signal containing information regarding the deformation.

Another object of the present invention is to provide a restraints control module which utilizes the information within the electronic signal to make deployment decisions for the restraints of the vehicle.

An advantage of the present invention is that the sensing system can include sensor elements arranged in a manner that provides a degree of azimuthal resolution regarding deformation caused by an impact event, allowing the sensors to provide more specific information regarding the impact.

Another advantage of the present invention is that the sensor element provides a variable output that is used to discriminate between various impact situations, thus improving passive restraint deployment decisions.

Further objects and advantages of the present invention will become apparent by reference to the following description of the preferred embodiment and appended drawings wherein like reference numbers reflect the same feature, element or component.

DETAILED DESCRIPTION OF THE PREFERRED EMBODIMENTS

Figure 1:
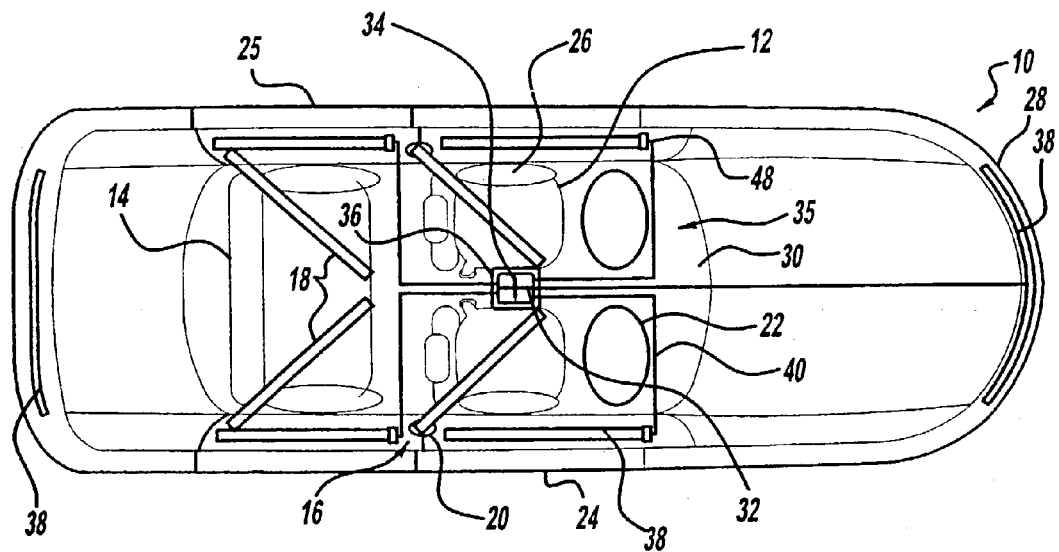
FIG. 1 is a schematic plan view of a vehicle, including sensor elements, in accordance with the present invention.
Figure 2:
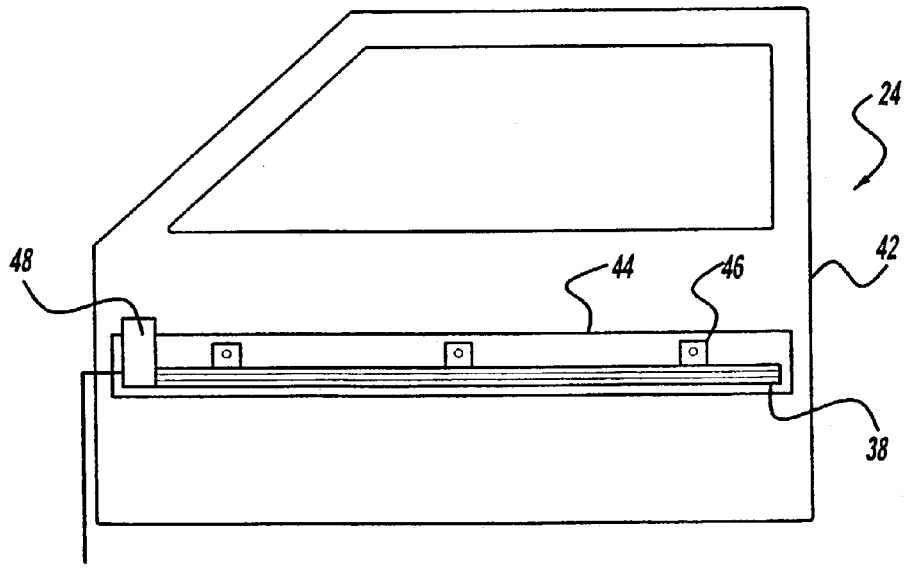
FIG. 2 is a schematic side view of a vehicle door, with a sensor element mounted thereon in accordance with the present invention.

A vehicle 10 having several deployable restraints and including the present invention is illustrated in FIGS. 1 and 2. The vehicle has front 12 and rear 14 seats in a passenger compartment 16. Mounted in proximity to each seat is a seat belt 18, each of which may be equipped with pretensioners 20 as deployment restraints. Mounted in front of the two front seats 12 are front airbags 22. The illustrated vehicle 10 includes two front doors 24 and two rear doors 25, all of which may include a side airbag 26 mounted alongside, adjacent the front 12 and rear 14 seats. The vehicle 10 has a front bumper 28 with a pedestrian airbag 30 mounted in proximity to the bumper 28.

The vehicle 10 may be equipped with accelerometers, a first frontal accelerometer 32 oriented to sense longitudinal acceleration of the vehicle and a second side accelerometer 34 oriented to sense side-to-side (i.e., lateral) acceleration. Alternatively, the two accelerometers 32, 34 can be replaced with a single dual-axis acceleration sensor if so desired. These accelerometers 32, 34 are electronically connected to and in communication with a restraints control module 36.

The impact sensing system 35 of the present invention comprises deformation sensor elements 38 located at various positions throughout the vehicle, a restraints control module 36, and electrical connections 40 between the sensor elements 38 and the restraints control module 36. The sensor elements 38 of the current invention may be utilized in several areas of the vehicle. Generally, the sensor elements 38 will be mounted in areas around the body of the vehicle 10 in which impact sensing is desired, i.e., areas in which impact events are known to occur. For example, the sensor elements 38 may be disposed within a door 24 of the vehicle 10 for detecting side impact events. Also, a sensor element 38 may be disposed near or within a bumper 28 of the vehicle 10. So disposed, the element 38 can be utilized to monitor for impact events involving pedestrians. Other locations may, of course, be desirable. No matter where located, the sensor element 38 is disposed in a manner that allows direct detection of an impact event. That is, the sensor element 38 is disposed in a manner that ensures its physical involvement in an impact event generating sufficient deformation of the vehicle 10. The term deformation sensor is used to describe sensors capable of this direct physical involvement in vehicle impact events causing sufficient deformation of the vehicle 10. For example, as shown in FIG. 2, the sensor element 38 may be disposed on a structural element of a vehicle door 24. In this configuration, the sensor element 38 will directly participate in a side impact event affecting the vehicle door 24. Also, for monitoring pedestrian and frontal impact events, the sensor element 38 may be directly embedded in the compressible material of the bumper 28. The position of the sensor element 38 allows the sensing system 35 to discriminate among impact events. For example, the outer skin 42 of a vehicle door 24 and the outer layer of a vehicle bumper 28 are frequently exposed to impact events not warranting deployment of a passive restraint. A slight indentation to either of these structural elements does not warrant deployment. Therefore, positioning the sensor element 38 on the surface of either of these structural elements may lead to unnecessary deployment. Positioning the sensor element 38 sufficiently underneath the outer skin 42 of the structural element while ensuring its participation in significant impact events eliminates such unnecessary deployments.

FIG. 2 illustrates an example of the sensor element 38 mounted in a vehicle door 24. The sensor element is positioned underneath the outer skin 42 and near a main structural element, such as a structural reinforcement beam 44. The sensor element 38 can be mounted thereto via attachment points 46. Alternatively, the sensor element 38 can be disposed within a housing member (not illustrated), and the housing member can be mounted securely to the reinforcement beam 44 via attachment points 46. The attachment points 46 can be fasteners, welding, etc., so long as the sensor element 38 and/or housing is securely and rigidly mounted to the reinforcement beam 44.

Figure 3:
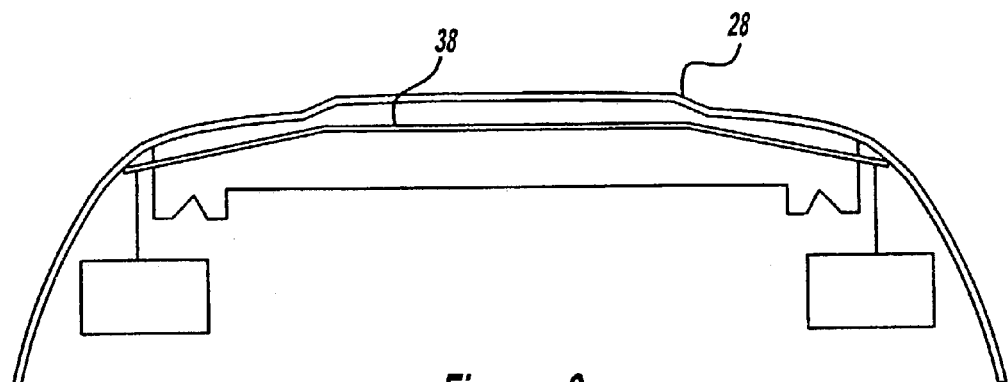
FIG. 3 is a schematic plan view of a vehicle bumper with a sensor assembly associated therewith in accordance with the present invention.
Figure 4:
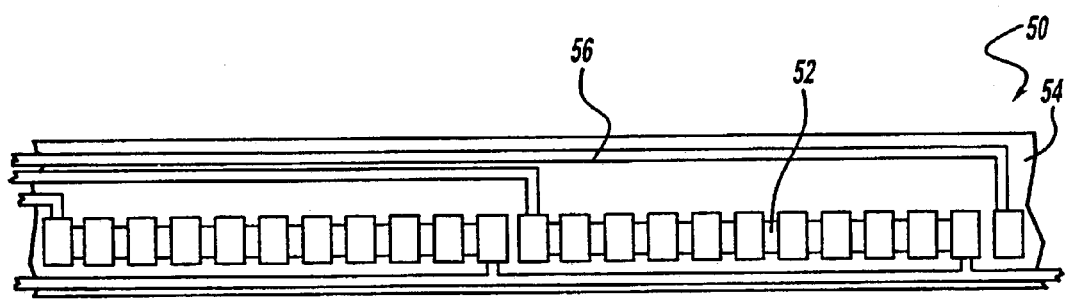
FIG. 4 is a schematic view of a unitary bend sensitive resistance element in accordance with the present invention.

FIG. 3 illustrates an example of the sensor element 38 mounted near the front bumper 28. The sensor element 38 is located behind the outer layer of the bumper 28, and may either be directly embedded in the compressible material of the bumper 28, or be mounted behind the bumper 28 in a manner similar to that described above for the sensor element 38 located within a vehicle door 24. This sensor element 38 will detect impacts to the front bumper 28, and demonstrates the ability of the sensing system 35 to discriminate among impact events based on the severity of the event. Depending on the severity and the force of the impact detected by the sensor element 38, the restraints control module 36 may deploy either a pedestrian airbag 30, for minor impacts typical of those with pedestrians, or the front 22 and/or side 26 airbags for major impacts such as vehicle crashes. The ability to discriminate between these two very different types of impacts is developed more fully below.

Each sensor element 38 is in electrical communication with the restraints control module 36 via electrical connections 40. There may be a signal-processing module 48 electrically situated between the sensor elements 38 and the restraints control module 36, i.e., the signal processing module 48 is electrically connected to both the sensor elements 38 and the restraints control module 36. The restraints control module 36 is electrically connected to and in communication with the deployable restraints of the vehicle 10.

In the preferred embodiment, the sensor element 38 constitutes a bend sensitive resistance element 50. Bend sensitive resistance elements, such as the flexible potentiometer disclosed in U.S. Pat. No. 5,583,476 to Langford, provide electrical signals that vary as the element is deformed. A bend sensitive resistance element 50 is only one example of the type of sensor that can be used as the sensor element 38 in the sensing system 35 of the present invention. As such, the specific example of a bend sensitive resistance element 50 is only illustrative in nature and is not intended to limit the scope of the present invention in any way.

Preferably, the bend sensitive resistance element 50 is comprised of a rectangular ink strip 52 composed of a conductive ink which has been treated to produce cracks in the ink, a flexible substrate 54, and electrical connectors 56 for connecting the conductive ink strip 52 and the restraints control module 36. The flexible substrate 54 is preferably about 1" wide and has a length approximately equal to the structural element being monitored. In one embodiment, the ink strip 52 constitutes a single continuous strip of the conductive ink having a length slightly less than that of the flexible substrate. Preferable in this embodiment, the ink strip 52 is approximately ¼" in height, and has a length approximately equal to the length of the structural element to be monitored. For example, for a bend sensitive resistance element 50 utilized to monitor for side impacts, the ink strip 52 preferably has a length approximately equal to the length of the appropriate vehicle door 24 and is disposed on a flexible substrate 54 slightly longer in length.

It will be appreciated that the flexible substrate 54 can vary significantly from the dimensions detailed above. For example, the substrate 54 can take a size and form approximately equal to the interior space of a door 24 panel. In this configuration, ink strips 52 could be disposed in a variety of patterns along the flexible substrate 54, providing a multitude of deformation sensors. The patterns could be designed to mimic high-probability impact sites. It will be further appreciated that the ink strips 52 can vary from the dimensions detailed above to meet specific impact monitoring needs.

Figure 5:
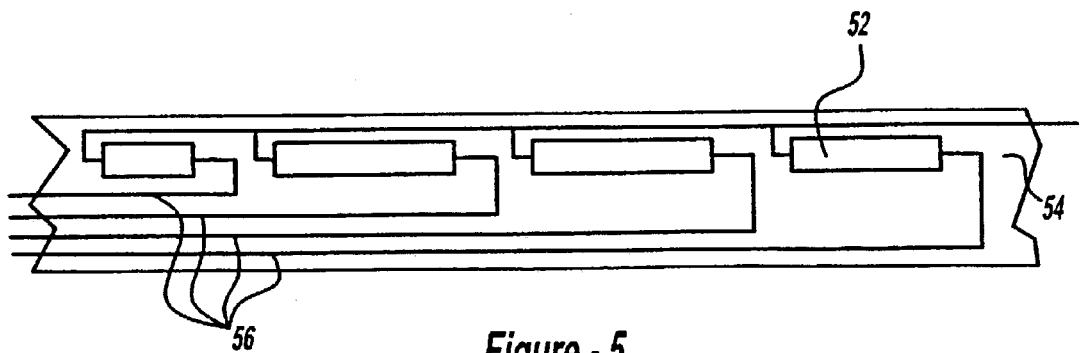
FIG. 5 is a schematic view of a plurality of deformation sensor elements capable of providing azimuthal resolution in accordance with the present invention.

In an alternate embodiment illustrated in FIG. 5, the conductive ink is arranged into several smaller strips 52 each in independent electrical communication with the restraints control module 36. In this embodiment, the smaller ink strips 52 are disposed horizontally relative to each other, i.e., end-to-end, along a unitary flexible substrate 54. The smaller ink strips are preferably about ¼" in height by approximately 4" in length. As in the previous embodiment, the flexible substrate 54 is preferably about 1" in height and has a length approximately equal to the structural element being monitored. An appropriate number of smaller ink strips 52 necessary to span the length of the flexible substrate 54 is disposed on the flexible substrate 54. It has been determined that, for a typical front vehicle door 24, seven ink strips 52 of the preferable dimensions, laid end-to-end on the flexible substrate 54 provide adequate coverage of the span.

Arranged in this manner, the smaller ink strips 52 act as individual bend sensitive resistance elements 50, providing a degree of azimuthal resolution. For example, when an impact event occurs near the latch of the door 24, causing deformation only in that area, the element 50 located in that area will deform, and therefore it will be the only element 50 that relays a deformation signal to the restraints control module 36. This localization of the impact will allow the restraints control module 36 to better discriminate among severe and non-severe impact events. In contrast, if the element 50 constitutes a single, continuous ink strip 52 along the span, no such localization of the impact occurs. For example, when an impact occurs near the latch, the element 50 relays an impact signal. Because localized elements 50 were not present, though, the signal does not relay information regarding the locality of the impact beyond the general area of the vehicle door 24. Consequently, the restraints control module 36 does not have information regarding the precise location of the impact when making a subsequent deployment decision. Furthermore, this arrangement of a plurality of bend sensitive resistance elements 50 provides an ability to resolve the location and width of an impact event relative to the vehicle 10 by comparing the extent of deformation between neighboring bend sensitive resistance elements 50.

The conductive ink strip 52 of the bend sensitive resistance element 50 is printed onto the flexible substrate 54. Preferably, the substrate 54 is a flexible material such as polyamide. Polyester or other suitable materials capable of providing the necessary flexibility may also be used. The flexible nature of the substrate 54 allows the bend sensitive resistance element 50 to be disposed along a non-linear surface. Also, the flexible substrate 54 provides the flexibility necessary to allow the ink strip 52 to structurally react in response to impact events, which is necessary for proper operation of the bend sensitive resistance element 50, and consequently the sensing system 35. The flexible substrate 54 may have an adhesive backing which facilitates placement on structural elements or in a housing.

The cracks are small, interspersed fissures in the ink strip 52 of the bend sensitive resistance element 50. The cracks are randomly spaced and oriented throughout the ink strip 52. The cracks are disposed along a single side of the strip 52, making the bend sensitive resistance element 50 sensitive in only one direction. When used to monitor for the occurrence of side impact events in a vehicle door 24, the surface having the cracks is typically directed toward the passenger compartment 16 of the vehicle 10. As the bend sensitive resistance element 50 is bent inward, such as when a side impact occurs, the cracks open and increase the resistance of the element 50. This change in resistance can be detected by the restraints control module 36, which continually monitors the resistive output of the element 50.

In addition to bend sensitive resistance elements 50, the sensor element 38 may be any other type of sensor element 38 capable of being disposed in a manner that allows direct physical involvement in an impact and gathering and relaying information regarding the impact. That is, the sensor element 38 may be any other type of deformation sensor element. For example, the sensor element 38 may be a piezoelectric cable or a fiber-optic cable. No matter the type of deformation sensor utilized, the sensor element 38 can be either a unitary item spanning the length of a vehicle structural element, or may be a plurality of elongate sensor elements 38 horizontally situated so as to be capable of providing azimuthal resolution of impact events.

Turning now to the operation of the sensing system 35 of the present invention. As discussed above, the sensor element 38 of the present invention is able to directly participate in a vehicle impact event occurring in the area of the vehicle 10 in which the sensor element 38 is positioned. The sensor element 38 provides a variable output that is proportional to the extent of deformation induced in the sensor element 38 by an intruding object driving the impact event. It will be noted that the bend sensitive resistance element 50 of the preferred embodiment, due to its flexible nature and ability to have an adhesive backing on the flexible substrate 54, is particularly easy to mount in various locations of the vehicle 10 such that it will directly participate in and therefore detect an impact, and subsequently relay information regarding the impact event.

Figure 6A:
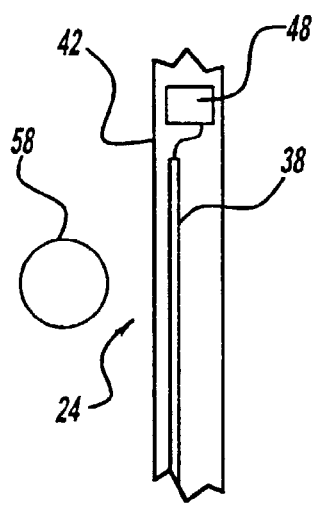
FIGS. 6a–6c are graphical illustrations of the approach of the side of a vehicle containing a deformation sensor element to a pole and impact therewith, in accordance with the present invention.
Figure 6B:
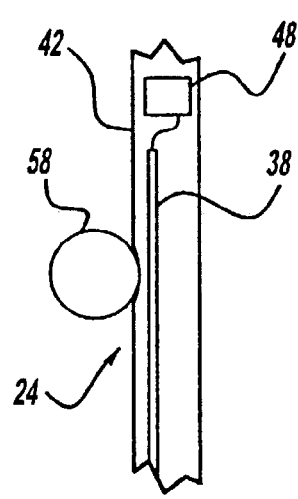
Figure 6C:
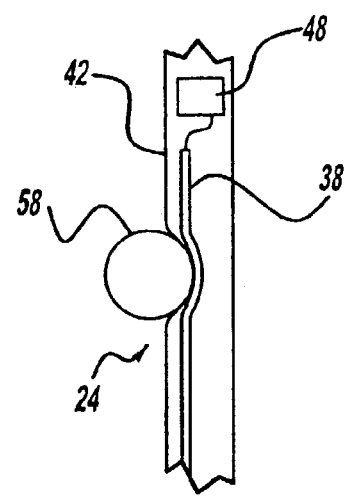

FIGS. 6a–6c show an impact event involving a pole 58 and a vehicle 10 containing a sensing system 35 according to the present invention. The door 24 of the vehicle 10 contains a sensor element 38 in communication with a restraints control module 36. The sensor element 38 is positioned underneath the outer skin 42 of the door 24. The figures illustrates the physical consequences of the impact over time. As the impact progresses, the pole 58 first deforms the outer skin 42 of the vehicle door 24. As shown in FIG. 6b, the sensor element 38 is not involved at this point due to its position relative to the outer skin 42. However, as shown in FIG. 6c, once the impact progresses to a point where the sensor element 38 is situated, the pole 58 actually deforms the sensor element 38. At this point, the sensor element 38 is directly participating in the impact event, which is necessary for the operation of deformation sensors. As the impact progresses further, the sensor element 38 deforms further. The sensor element 38 provides an output signal 60 that, when altered, indicates the occurrence of an impact event. For example, fiber optic deformation sensors provide an output signal 60 that consists of the transmission of light. In the preferred embodiment, the resistance of the bend sensitive resistance element 50 is the output signal 60, and increases as deformation progresses due to increased opening of the cracks in the ink strip 52. The restraints control module 36 detects any change in the output signal 60, as described below, and makes a deployment decision based thereon.

Figure 7A:
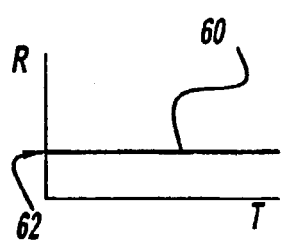
FIGS. 7a–7c are graphical illustrations of the sensor output, corresponding to the impact depicted in FIGS. 6a–6c, respectively.
Figure 7B:
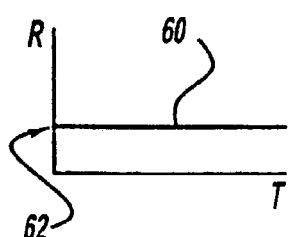
Figure 7C:
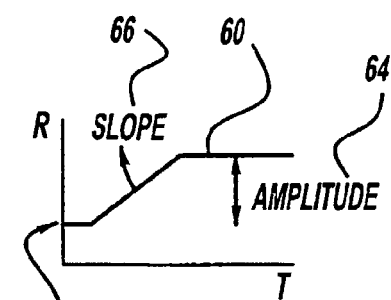

FIGS. 7a–7c illustrate a corresponding output signal 60 transmitted by the sensor element 38 during the impact event depicted in FIGS. 6a–6c. As the impact event progresses over time, the output signal 60 varies depending on the extent of deformation of the sensor element 38. For the preferred embodiment, which utilizes a bend sensitive resistance element 50, the output signal 60 corresponds to the resistance of the sensor element 38. In FIG. 7a, before the impact event has occurred, the output signal 60 remains constant at a threshold output level 62. As the pole 58 deforms the outer skin 42 of the door 24 but has yet to reach the sensor element 38, the electrical output signal 60 remains constant at the threshold level 62, as illustrated in FIG. 7b. Once the sensor element 38 is involved in the impact event, and deformation of the sensor element 38 occurs, the output signal 60 changes to reflect the severity of the impact.

The amplitude 64 of the change in the output signal 60 indicates the extent of the deformation. That is, as more deformation is imposed on the sensor element 38, the output signal 60 changes more dramatically from the threshold output level 62. For the preferred embodiment utilizing bend sensitive resistance elements 50, it has been observed that the resistance typically changes by a factor of approximately ten when deployment-type events are encountered. The output signal 60 of the sensor element 38 will return to its original value, i.e., the threshold output level 62, when and if the sensor element 38 returns to its original and undeformed state. The slope 66 of the change in the output signal 60 indicates the rate at which the deformation occurred. If deformation occurs rapidly, the time required to achieve the change in the output signal 60 is relatively brief, producing a steep slope 66. Conversely, if the deformation occurs relatively slowly over time, the slope 66 will be correspondingly gradual in nature. Both the amplitude 64 and the slope 66 of the change in the output signal 60 can be used by the restraints control module 36 to make more effective deployment decisions. For example, if the amplitude 64 indicates a relatively severe impact event, the restraints control module 36 can deploy restraints to a greater extent, such as involving more restraints or deploying one restraint more fully. Also, if the slope 66 indicates a relatively slow impact event, the restraints control module 36 can slow down the rate of deployment.

The output signal 60 is sent via the signal-processing module 48 to the restraints control module 36, which then interprets the signal 60 to discriminate between different types and severity of impacts. Given that different types of objects involved in impact events, such as poles 58, barriers, pedestrians and other vehicles, will produce different output signals 60 for a given speed and acceleration of the vehicle 10 during the impact event, the signal 60 will vary accordingly. The ability of the sensing system 35 of the present invention to provide azimuthal resolution of an impact event adds another degree of variance to the output signal 60. The resulting ability to distinguish, for example, pole-impact events from low-speed barrier impacts, will provide a more accurate decision from the restraints control module 36 for when to deploy a restraint device, which restraint to deploy, and the extent of such deployment. Furthermore, the ability to determine the location and width of impact with the vehicle 10 will allow for more effective decisions regarding which restraints need be deployed.

The restraints control module 36 includes hardware and/or software for processing incoming output signals 60, determining if a passive restraint threshold has been met and sending a deployment signal to the passive restraints, such as the front airbags 22, the side airbags 26, and/or the pedestrian airbag 30.

In order to further improve impact determination and passive restraint firing decisions, one may wish to employ the output signal 60 from the sensor elements 38 of the present invention along with the output from the accelerometers 32, 34. The accelerometers 32, 34 are illustrated in FIG. 1 and also provide output signals processed by the restraints control module 36. While accelerometers are illustrated in the preferred embodiment, they are not necessary for the operation of the sensor elements 38 of the present invention.

For example, the particular sensor element 38 near the impact location may be used as the primary impact detection sensor, with the centrally mounted accelerometers employed as safing sensors. In this way, the characteristics of the strain detected by the sensor element 38 may be tempered by the amount of acceleration experienced by the vehicle as is detected by one or both of the accelerometers 32, 34. Another example of impact detection in which the different sensors are employed may include employing the accelerometers 32, 34 as the primary sensors for impact events, and modifying the thresholds for the deployment decision based upon the strain detected by a particular one of the sensor elements 38. No matter if the sensor element 38 or the accelerometers 32, 34 are utilized as the primary sensors, the azimuthal resolution provided by the sensor elements 38 can be utilized in conjunction with output from the accelerometers 32, 34 to resolve the localization and/or width for an impact event. This combination of impact information provides for a further degree of tempering, and increasing the number of possible deployment scenarios.

The foregoing disclosure is the best mode devised by the inventors for practicing the invention. It is apparent, however, that vehicle impact sensing systems incorporating modifications and variations will be obvious to one skilled in the art of impact sensors and systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims:

We claim:

1. A vehicle impact sensing system for detecting vehicular impacts causing structural elements of a vehicle to deform, the vehicle impact sensing system comprising:
    a plurality of bend sensitive resistance elements longitudinally spaced along a an elongated structural element of said vehicle, wherein each of the plurality of bend sensitive resistance elements are capable of generating an independent resistance output signal, the bend sensitive resistance elements each have a strip of conductive ink containing a plurality of cracks along a surface thereof,
    at least one passive restraint disposed within said vehicle, and
    a controller in independent electrical communication with each of the plurality of bend sensitive resistance elements, said controller detects a location of an impact along the structural element by determining which bend sensitive elements are activated and which bend sensitive elements are not activated based on a detected change in each of the independent resistance output signals.

2. The vehicle impact sensing system of claim 1 wherein said structural element of said vehicle is a structural reinforcement beam of a door of said vehicle.

3. The vehicle impact sensing system of claim 1 wherein said structural element of said vehicle is a bumper of said vehicle.

4. The vehicle impact sensing system of claim 1 wherein said at least one passive restraint is a side airbag.

5. The vehicle impact sensing system of claim 1 wherein said at least one passive restraint is a pedestrian airbag.

6. A vehicle impact sensing system for detecting vehicular impacts causing structural elements of a vehicle to deform, the vehicle impact sensing system comprising:
    a plurality of deformation sensor elements horizontally and longitudinally spaced along a structural element of said vehicle, each of said plurality of sensor elements being capable of generating a variable output signal;
    at least one deployable restraint disposed within said vehicle; and
    a controller in electrical communication with said plurality of deformation sensor elements and said at least one deployable restraint, said controller detects a location of an impact along said structural element by determining which deformation sensor elements are activated and which deformation sensor elements are not activated based on a detected change in each of the variable output signals.

7. The vehicle impact sensing system of claim 6 wherein said variable output signal of each of said deformation sensor elements is indicative of a resistance of each of said deformation sensor elements.

8. The vehicle impact sensing system of claim 6 wherein said structural element of said vehicle is a structural reinforcement beam of a door of said vehicle.

9. The vehicle impact sensing system of claim 6 wherein said structural element of said vehicle is a bumper of said vehicle.

10. A vehicle impact sensing system for detecting vehicular impacts causing structural elements of a vehicle to deform, the vehicle impact sensing system comprising:
    a plurality of deformation sensor elements longitudinally spaced along an elongated structural element of said vehicle, each of said plurality of sensor elements being capable of generating a variable output signal;
    at least one passive restraint disposed within said vehicle;
    at least one accelerometer; and
    a controller in independent electrical communication with each of said plurality of deformation sensor elements, said accelerometer and said at least one passive restraint, said controller detects a location of an impact along the structural element by determining which deformation sensor elements are activated and which deformation sensor elements are not activated based on a detected change in each of the variable output signals and deploys said at least one passive restraint.

11. The vehicle impact sensing system of claim 10 wherein said at least one accelerometer is oriented to detect acceleration in a longitudinal direction of said vehicle.

12. The vehicle impact sensing system of claim 10 wherein said at least one accelerometer is oriented to detect acceleration in a lateral direction of said vehicle.

13. The vehicle impact sensing system of claim 10 wherein said at least one passive restraint is a side airbag.

14. The vehicle impact sensing system of claim 11 wherein said at least one passive restraint is a front airbag.

15. The vehicle impact sensing system of claim 11 wherein said at least one passive restraint is a pedestrian airbag.

* * * * *